Dec. 11, 1923.
H. W. BUNDY
MACHINE FOR FORMING TUBES
Filed Sept. 15, 1922
1,476,796
3 Sheets-Sheet 1
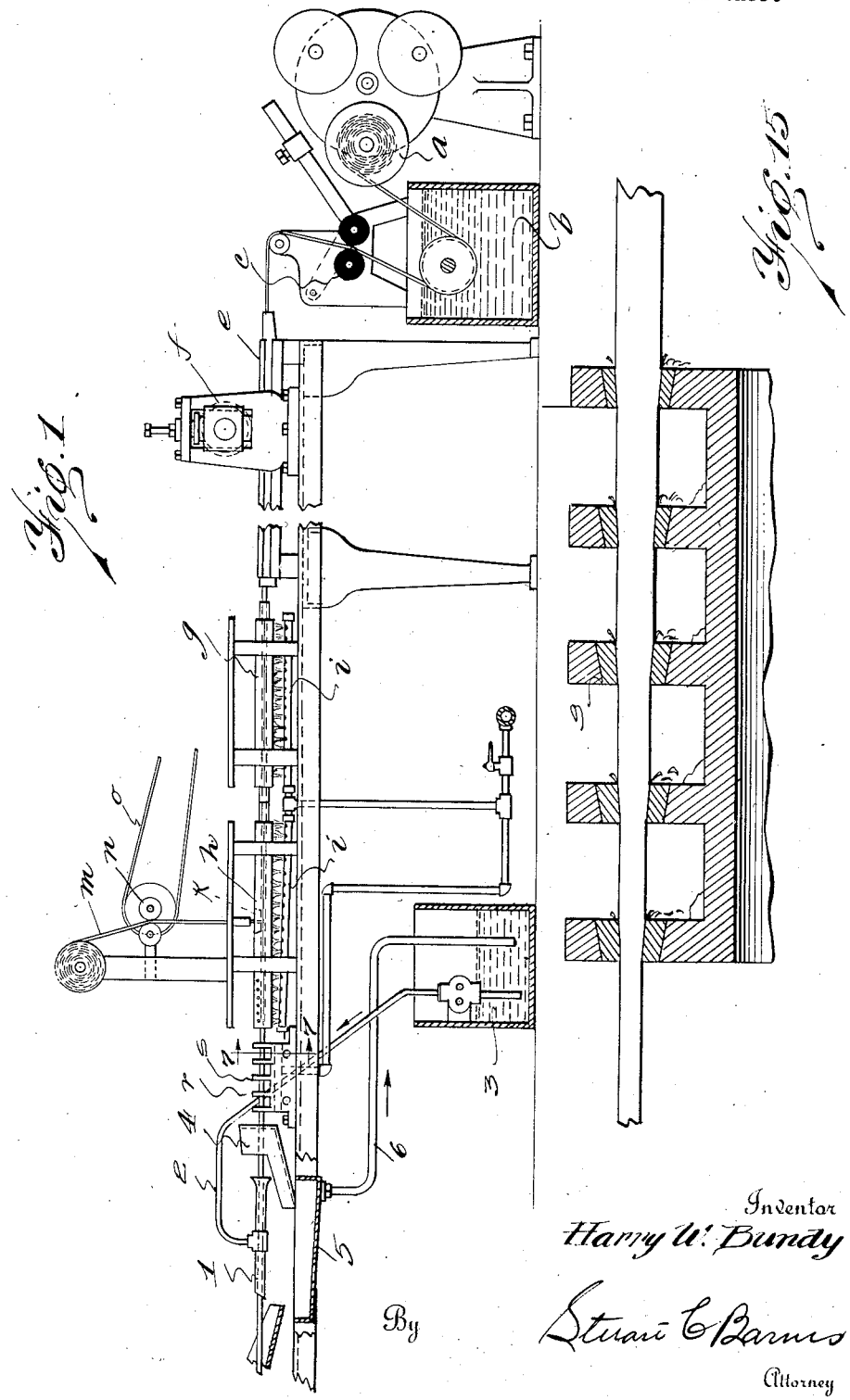
Inventor
Harry W. Bundy
By Stuart E. Barnes
Attorney Dec. 11, 1923.
H. W. BUNDY
1,476,796
MACHINE FOR FORMING TUBES
Filed Sept. 15, 1922      3 Sheets-Sheet 2
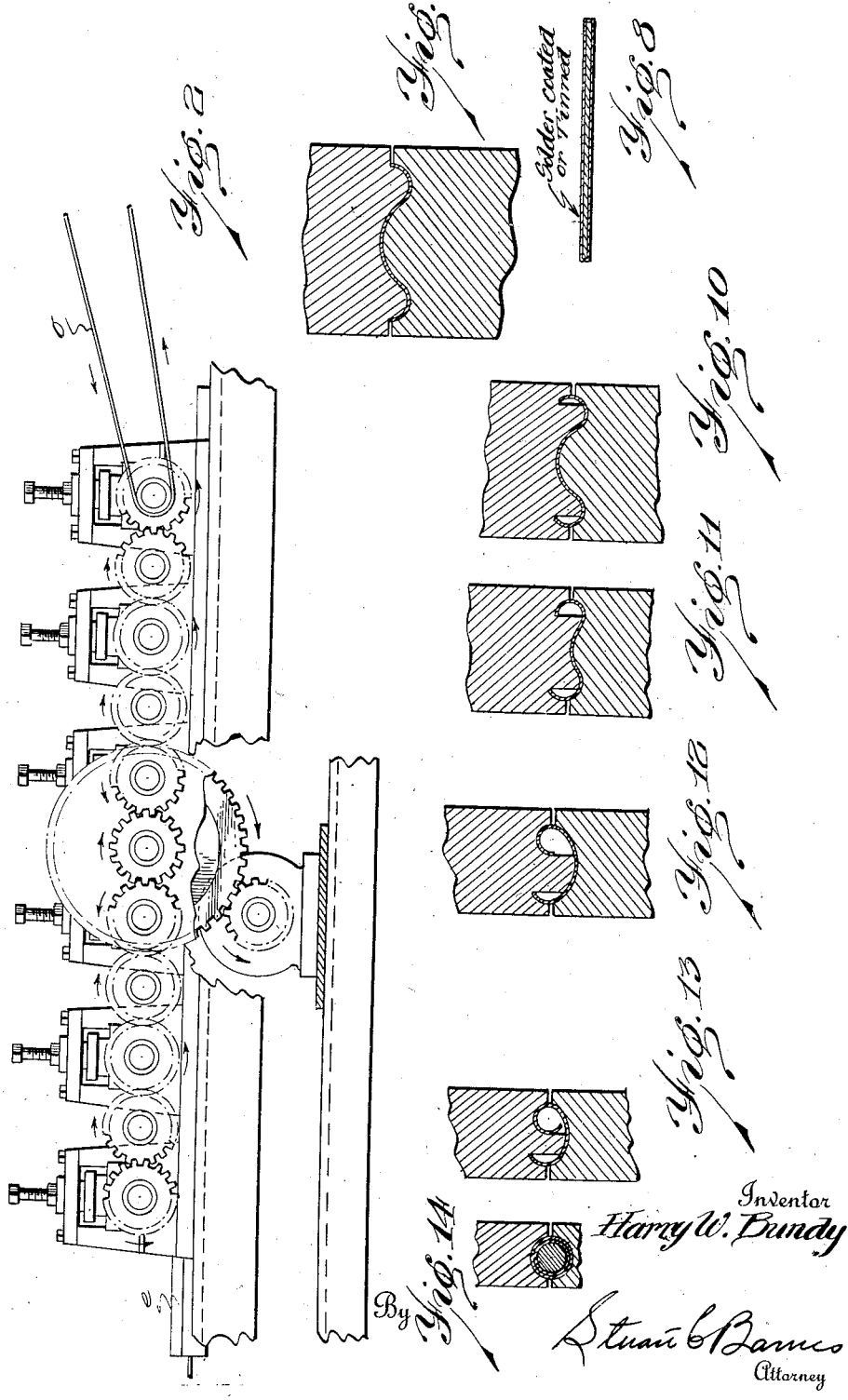

Dec. 11, 1923.
H. W. BUNDY
1,476,796
MACHINE FOR FORMING TUBES
Filed Sept. 15, 1922       3 Sheets-Sheet 3
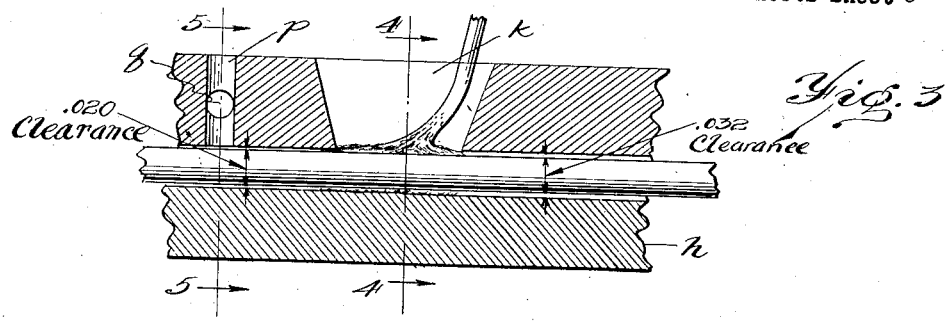
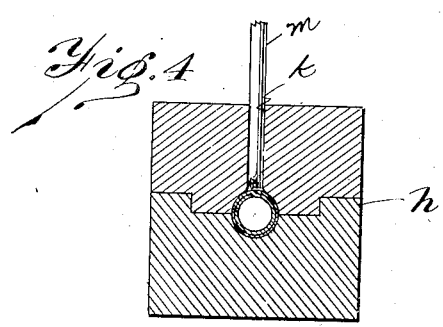
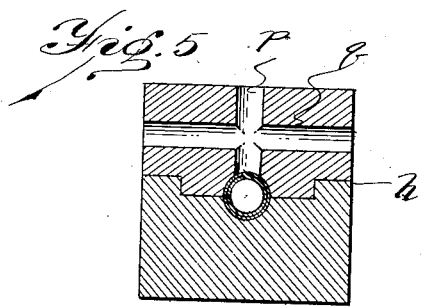
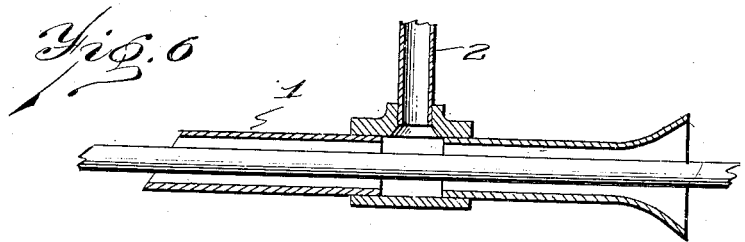
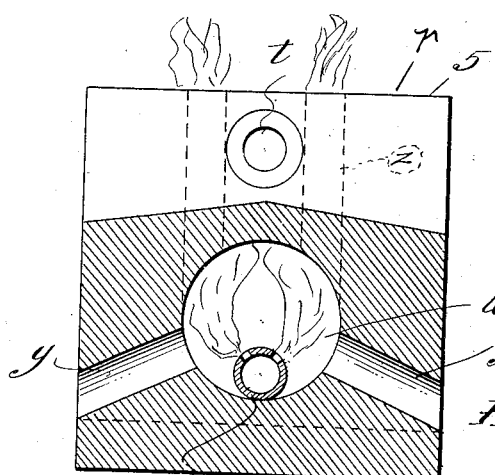
Inventor
Harry W. Bundy
By
Stuart C. Barnes
Attorney Patented Dec. 11, 1923.

1,476,796

UNITED STATES PATENT OFFICE.

HARRY W. BUNDY, OF DETROIT, MICHIGAN.

MACHINE FOR FORMING TUBES.

Application filed September 15, 1922. Serial No. 588,339.

*To all whom it may concern:*

Be it known that HARRY W. BUNDY, a citizen of the United States, residing at Detroit, in the county of Wayne and State of Michigan, has invented certain new and useful Improvements in Machines for Forming Tubes, of which the following is a specification.

This invention relates to a machine for making multiple ply soldered tubing. It is especially designed for making small tubing such as radiator tubing and gasoline line tubing used in automobiles.

It is the object of the invention to take a tinned or solder coated strip of metal, form this into a multiple ply tube and then sweat and solder the tubing, to reduce and size the tubing, and to set the solder. These features will be best understood after a complete description has been given of the invention.

In the drawings:

Fig. 1 is a side elevation of the apparatus.

Fig. 2 is a side elevation of the roll train, the larger portion of which is omitted by Fig. 1, which is a broken view.

Fig. 3 is a longitudinal section taken through the second sweating and soldering die.

Fig. 4 is a section on the line 4—4 of Fig. 3.

Fig. 5 is a section on the line 5—5 of Fig. 3.

Fig. 6 is a section through the water jacket which functions to set the solder.

Fig. 7 is a longitudinal section on the line 7—7 of Fig. 1.

Fig. 8 is a section through the strip that is used to make the tube.

Figs. 9 to 14, inclusive, are sections through the rolls showing the work in various stages of formation.

Fig. 15 is a longitudinal section of the scraping and sizing die.

In my prior applications Nos. 552,362 and 460,551, the methods carried out by the machine here to be described and claimed are described and claimed. In the present application the machine as it is actually used in production is portrayed and will be described.

A tinned strip, coated with a mixture of about seventy parts tin and thirty parts lead, is used as the stock. This is tinned on a machine such as described and claimed in my copending application No. 588,338, filed September 15, 1922. This tinned strip is mounted on a spool $a$, passes through the fluxing acid bath $b$, then up between the rolls $c$, which eliminate any excess of fluxing acid; the tinned strip then passes into the dies $e$, and the rolls $f$. Inasmuch as the specific construction of the dies and rolls which shape the strip as it travels longitudinally, is no part of the invention, these have not been shown and will not be described in detail. Suffice it to say that suitable rolls and dies are employed so that the strip passes through the configurations shown in Figs. 9 to 14, inclusive. The rolls shown in these figures are the rolls that will accomplish this purpose, but they will have to work in connection with suitably formed dies and guides between the rolls to shape the tube and guide it as it passes from roll set to roll set. The dies and the rolls together will be generically referred to as the forming apparatus.

From the forming apparatus the tube is pushed or pulled through the first sweating die $g$; these are cast iron dies having upper and lower sections as shown in Fig. 4, provided with a tenon and groove fit; in the center is a passageway of circular cross section to guide the tube through. These dies are kept very hot by the flames from the gas burner $i$; two separate dies are shown so as to cut down the length of each unit to avoid warping difficulties. However, any number of dies could be used.

In the second sweating die $h$ is a longitudinally running slot $k$, to receive the soldering strip $m$ that is fed down at a determined speed by the feed rolls $n$, driven by the belt $o$, at a speed having a predetermined ratio with respect to the speed of travel of the machine. As explained in my prior method application No. 552,362, I find that the best results are obtained when additional solder is applied to the seam of the tubing as it is pushed or drawn through the sweating die. I find that by capillary action the molten solder between the plies draws in more solder from the strips and makes an unexpectedly uniform distribution of the solder such as could not be obtained either by sweating alone or by applying the solder strip to the seam alone.

At suitable points along the top sections of the sweating dies, vertical openings $p$ are bored from the top into the center and the tube passageway, and horizontal openings *g* are bored in from the sides of the die to meet these vertical openings. These provide a passageway through which the carbonized fluxing acid can accumulate as it is scraped off from the tube in its passageway through the sweating dies. At suitable intervals it can be punched or blown out of these holes.

As the tube leaves the last sweating bath it is drawn through the sizing die *r*; this comprises a die block which is of special casting such as shown in Figs. 1, 7 and 15. This die block is provided at the top with a plurality of fins *s* through which are sizing and scraping openings *t*; in the center of the block is a large opening *u*, in which is the perforated gas pipe *x*. Air passages *y* lead in obliquely from the sides of the block. Vertical passageways *z* run up through the fins, two for each fin. One passageway on each side of the sizing and scraping opening. The mixed air and combustible gas is ignited and caused to burn. This keeps the die block and the fins relatively hot so that the solder will not set until the tube has been drawn through the scraping and sizing operations. The openings in each succeeding fin will be slightly less so that the tube will be drawn down to the exact shape desired. At the same time any excess solder will be scraped off from the exterior of the tube, leaving only a very thin film of solder on the exterior.

The tube immediately passes into the solder-setting apparatus, 1, which comprises simply a jacket fed with warm water from the pipe 2; water is pumped from a reservoir 3, under the bed of the machine up into this jacket, runs into the trough 4, then into the tray 5, and down through the pipe 6, into the reservoir.

The machine here described will make a very small size of tubing such as is used in automobile radiators and gas lines at a relatively fast rate. This tube is so nicely soldered together and the plies so tenaciously adhere that it requires a large number of severe twisting strains to break the tubing. It affords a product which makes a better tubing than lock seam tubing for radiators and is much cheaper than seamless tubing, and substantially as good as seamless tubing for these purposes. Ordinarily I use brass stock, but obviously other metal could be used in the formation of the tubing.

What I claim is:

1. In a machine for the purpose specified, the combination of a tube forming apparatus and tube sweating apparatus arranged in line and operating simultaneously to continuously propel a strip of tinned metal through the forming apparatus and sweating apparatus to first fashion the strip into a tube and then complete the tube by sweating portions of the same together by melting the tin coating.

2. In a machine for the purpose specified, the combination of a tube forming apparatus and sweating apparatus arranged in line and serving to propel a tinned metal strip continuously through the forming apparatus to fashion the same into a plural ply tube and through the sweating apparatus to melt the tin coating and cement the plies together.

3. In a machine for the purpose specified, the combination of a tube forming apparatus and sweating apparatus, arranged in line for the purpose of fashioning a longitudinally travelling tinned metal strip into tube form with a plurality of plies, said sweating apparatus sweating the plies together by heating the tube and melting the coating of solder or tin on the strip, while the same is travelling longitudinally.

4. In a machine for the purpose specified, the combination of means for fashioning strip stock of longitudinally travelling solder-coated metal into a tube having a plurality of plies, and sweating apparatus arranged in line with said forming apparatus to take the travelling tube and sweat the plies together, said means and apparatus operating to propel the stock continuously through the same to coincidentally fashion the tube and cement the plies together.

5. In a machine for the purpose specified, the combination of means for forming longitudinally travelling strip stock of metal into a tube having a plurality of plies, means arranged to sweat the travelling tube as it leaves the forming apparatus to cause the plies to adhere together.

6. In a machine for the purpose specified, the combination of means for forming longitudinally travelling tinned strip stock into a tube having a plurality of plies, and a sweating die arranged in line with said tube forming means to take the travelling tube as it leaves the forming means and sweat the plies together while still travelling.

7. In a machine for the purpose specified, the combination of a fluxing acid bath, means for fashioning a longitudinally travelling tinned strip stock of metal as it leaves the fluxing acid bath into a tube having a plural ply cross section, and sweating means located in line with said tube fashioning means, for taking the travelling tube as it issues out of the tube forming means and sweating the plies together.

8. In a machine for the purpose specified, the combination of means for forming longitudinally travelling strip stock of metal into a tube with overlapping portions, means for soldering and sweating overlapping portions of the travelling tube as it issues from the forming apparatus, and means for sizing and reducing the tube as it issues from the sweating apparatus.

9. In a machine for the purpose specified, the combination of means for forming longitudinally travelling metal strip stock into a tube with overlapping portions, means for soldering and sweating the plies together as the tube issues from the tube forming apparatus, means for reducing and sizing the tube as it issues from the sweating means, and means for setting the solder as the tube passes the sizing and reducing means.

10. In a machine for the purpose specified, the combination of means for forming longitudinally travelling tinned strip stock, into a tube having a plural ply formation, means for sweating the tube comprising a longitudinally running die having an opening therethrough for guiding the tube as it leaves the forming means, and means for heating the die.

11. In a machine for the purpose specified, the combination of means for fashioning longitudinally travelling strip stock of tinned metal into a tube having a plural ply formation, means for sweating the tube as it passes out of the fashioning means, and means for feeding additional solder to the seam of the tube.

12. In a machine for the purpose specified, the combination of means for fashioning longitudinally travelling tinned strip stock of metal into a tube having a plural ply formation, means for sweating the travelling tube as it issues from the tube forming apparatus, and means for feeding additional solder to the seam at a predetermined speed ratio, dependent upon the speed of the machine in feeding the tube forward.

13. In a machine for the purpose specified, the combination of means for fashioning longitudinally travelling tinned strip stock of metal into a tube having a plural ply section, a sweating die arranged in line with said tube forming means, and provided with a solder opening, and means for feeding additional solder into the said opening.

14. In a machine for the purpose specified, the combination of means for fashioning longitudinally travelling tinned strip stock of metal into a tube having a plural ply cross section, a sweating die arranged in line with the tube fashioning means, to take the tube as it issues from said means, and sweat the plies together; die being provided with a recess and a solder strip over the seam of the tube to feed additional solder thereto, and means for heating the die.

15. In a machine for the purpose specified, a scraping and reducing die, comprising a plurality of spaced fins, having openings aligned and of gradually reduced size, through which the tube passes, and means for heating said fins.

16. In a machine for the purpose specified, a sizing and scraping die, comprising a block provided with a plurality of fins on its top, spaced apart and having aligned openings of gradually reduced size, and means for heating the block and fins.

17. In a machine for the purpose specified, a sizing and scraping die, comprising a block provided on its top with a plurality of spaced apart fins, having tube passage openings, arranged in line, and of gradually reduced size, and having vertical openings at the sides of said tube passages, said block provided with a longitudinal central opening, communicating with said vertical openings, and means for furnishing a combustible gas and a combustion-supporting gas to the said central openings and vertical openings.

In testimony whereof I affix my signature.

HARRY W. BUNDY.